May 1, 1956　　　　H. W. BIGGE　　　2,743,936
VARIABLE WIDTH LOAD CARRIER
Filed Oct. 2, 1953　　　　　　　　　3 Sheets-Sheet 1

INVENTOR.
HENRY W. BIGGE
BY
ATTORNEY

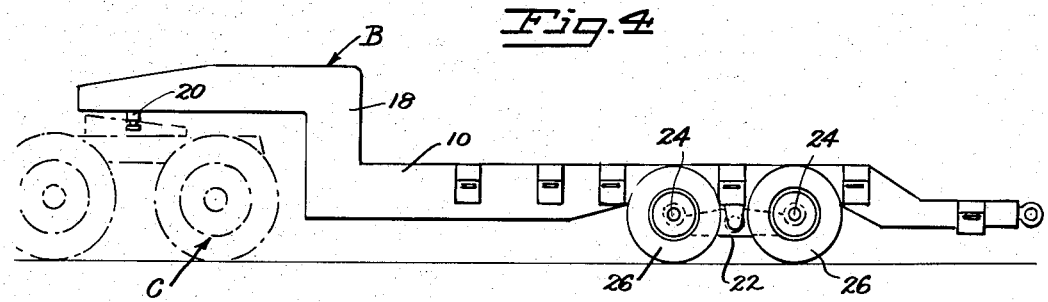
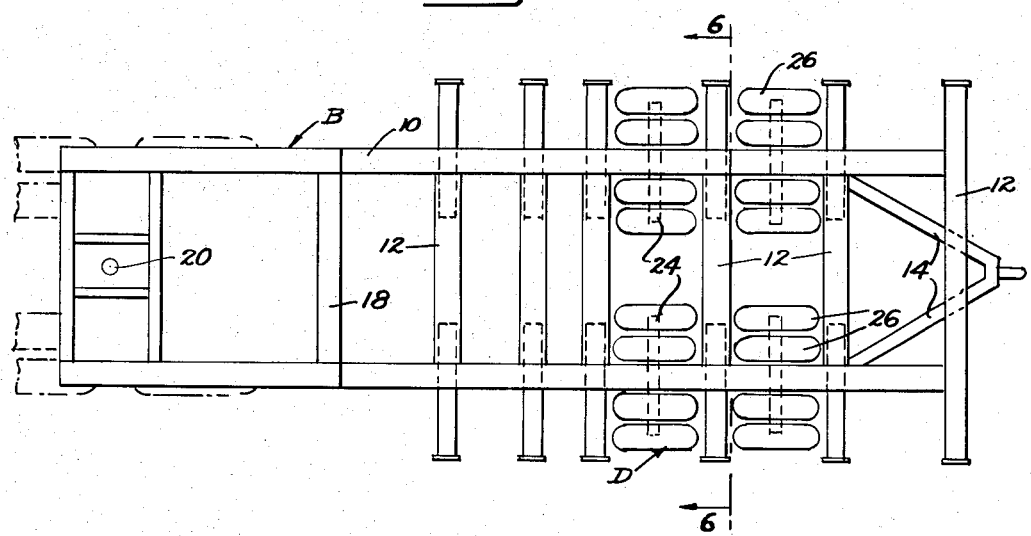
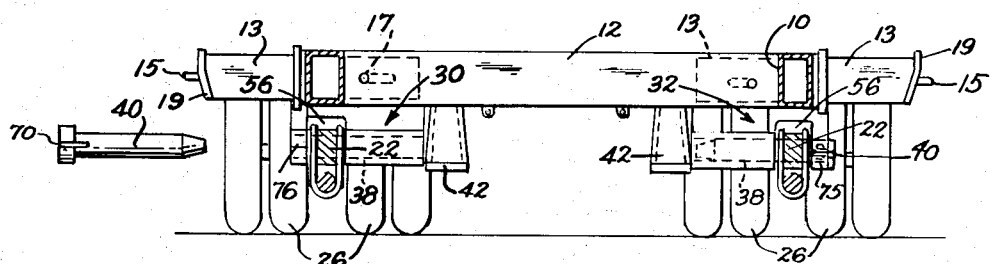

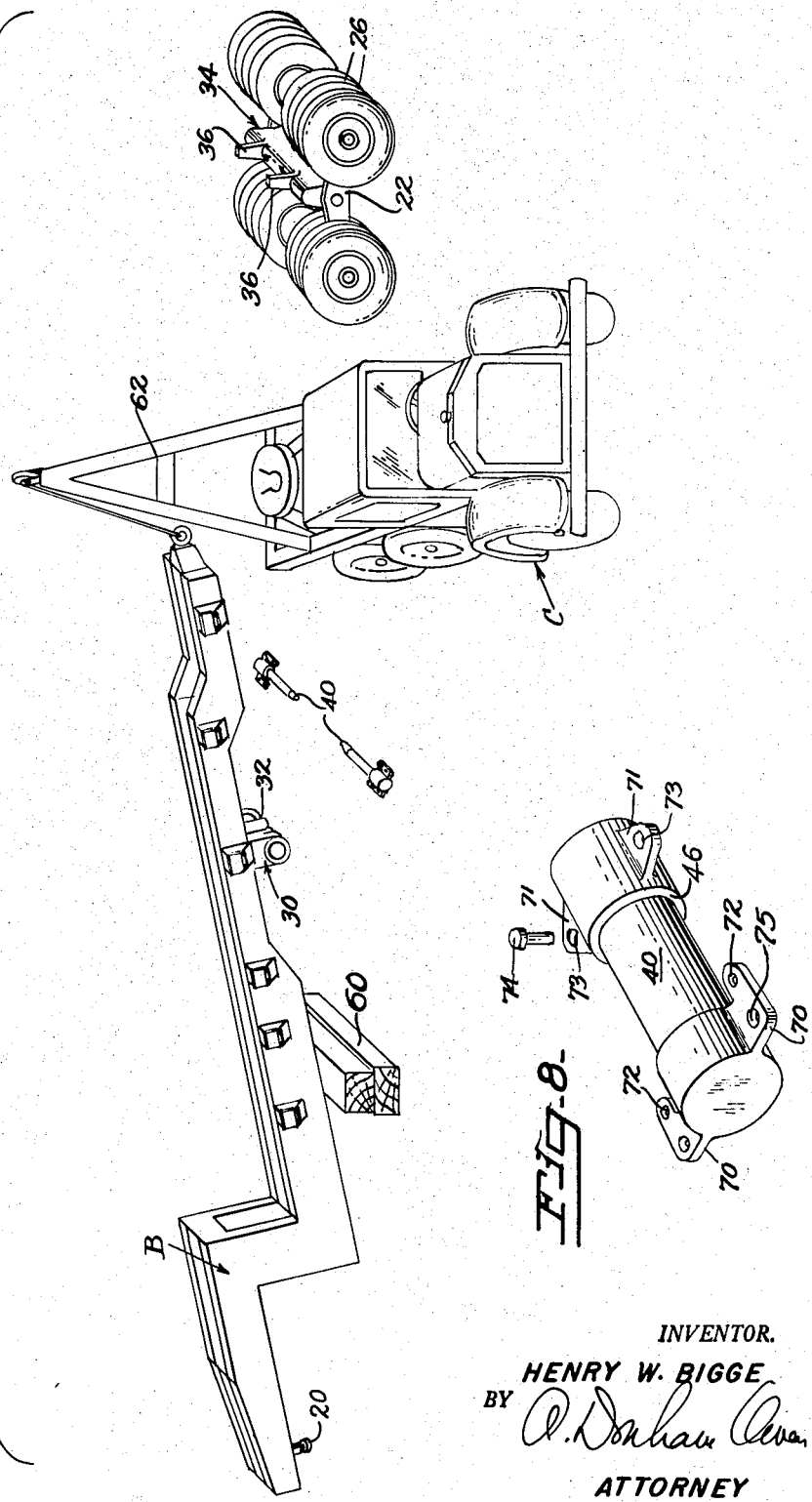

United States Patent Office 2,743,936
Patented May 1, 1956

2,743,936

VARIABLE WIDTH LOAD CARRIER

Henry W. Bigge, Oakland, Calif.

Application October 2, 1953, Serial No. 383,757

6 Claims. (Cl. 280—34)

This invention relates to a variable width load carrier of a general type designed to transport loads weighing 30 tons and above, and has particular application to a variable width low bed carrying vehicle having a track width, when loaded, that exceeds the normal widths prescribed by existing highway regulations.

Because of the tremendous increase in heavy hauling operations in modern times, nearly all of the States and most cities have enacted legislation to protect their various highways and streets so that the highway surfaces will not be crushed, cracked, or otherwise damaged.

Most of the statutes adopt weight distribution formulas which prescribe legal load limits for any particular load carrying vehicle, regulating the manner in which the load may be distributed over the pavement. For example, the usual formula provides for a maximum distributed load on each axle or axle cluster depending on its width and spacing from other axle clusters, and further limits the maximum gross load for any particular vehicle. In addition, maximum lengths and widths are imposed on the entire load carrying combination, based generally on the prescribed standard widths for highway lanes and vehicle turning radius considerations.

When the load carrying vehicle exceeds these maximum limitations, it is generally necessary to apply for a special permit relating to the particular load carrying operation involved. These permits generally allow (1) a certain percentage overload above the customary legal limit based on the weight distribution formula; (2) additional consideration is granted if an axle has more than the usual four tires; (3) finally, more weight is allowed over items (1) and (2) if the track of these added tires is greater than the legal width, thus distributing the load stresses over an even greater area of roadway. Since many States require an overwidth permit whenever the body width exceeds 8 feet or the width of the tires exceeds 100 inches, a job of heavy hauling often involves a combination overload and overwidth permit.

Such permits are generally granted on express condition that the applicant comply with certain restrictions stated in the permit, which restrictions are removed only when the overload, overlength, or overwidth conditions cease to exit. The following are examples of such restrictions:

1. The length of trip is generally restricted.
2. The equipment may be operated only during daylight hours.
3. The equipment may be operated only in fair weather.
4. The equipment cannot be operated weekends or holidays.
5. Only prescribed routes may be followed.
6. A particular operating radius is prescribed.

Such restrictions are a particular handicap to the hauler using extra wide equipment, under an overwidth permit, since once the operation has been completed the empty piece of equipment must still comply with the permit. It is not uncommon that an empty carrying vehicle, vitally needed elsewhere, must remain idle under the restrictions of the permit. For example, a haul may be completed late on a Friday, necessitating that both the driver and the equipment wait until the following Monday before proceeding to the site of the next job. The heavy hauler is similarly restricted when a shorter return route is available, or when the weather is not sufficiently bad to slow ordinary traffic, or when darkness or holidays intervene.

Such delays and layovers are a large item of expense and annoyance, since not only is the effective work week of the equipment shortened, but the hauler must also pay added wages for the enforced idleness of his drivers during the layover. Likewise, the heavy hauler is severely handicapped by his inability to use the restricted hours, routes, or weather conditions in the everyday shifting of his men and equipment for the effective disposal of the work on hand.

Another problem arises because the loading platforms of carrying vehicles for massive loads should, preferably, be very close to the ground. The object is to minimize the lifting operation necessary in loading and unloading operations. Consequently, most massive cargo carriers are of the "low bed" type supported by a plurality of relatively small tired axle clusters with the loading platform positioned as close to the tires as possible. This is generally accomplished by providing a series of wheelwells allowing the tires to ride well up into the carrying frame.

The positioning of these wheelwells prohibits any attempt to adjust the length of existing axles to provide a narrower track width without extensive reconstruction of the frame. The same problem confronts an attempt to use interchangeable axles. Conversely, elevating the load carrying platform or narrowing the load carrying frame would result in a loss of the desirable low bed characteristics, and would likewise be unsatisfactory.

Another problem arises because of the size and weight of the component parts of the running gear used in heavy load carriers. Any attempt at varying the track width which would require the driver to dismantle or reassemble these parts would be beyond the capabilities of a driver in the field. Also, the facilities necessary to handle such work on heavy equipment are not readily available to the driver in most areas.

The present invention is directed to a variable width load carrier that appears now to be a simple solution to all these problems, and one object of the present invention is to provide a narrow track trunnion combination permitting unrestricted travel while the load carrier is unloaded, but which will allow the wheels to be moved apart to provide a wide track to distribute the load over the highway during a hauling operation.

Another object of the present invention is to provide a dual trunnion combination having a relatively narrow axle width, but which may be readily dismantled in part to produce a single trunnion axle assembly having a relatively wide axle width.

Another object is to devise a simple rugged coupling mechanism as part of a dual trunnion axle assembly for load carrying vehicles whereby the assembly may be easily uncoupled in the field at the direction of the driver of the vehicle, or by the driver alone, if necessary.

Another object is to provide such a coupling mechanism for a dual trunnion axle assembly that will permit the driver to uncouple the assembly in safety and to reassemble it as a single unit with little danger of the load carrying frame falling on the driver during the operation.

Other objects and advantages of the present invention will be apparent from the following description and from the drawings, in which:

Fig. 4 is a view in side elevation of the device of Fig. 1 with a detachable portion of the narrow track trunnion assembly removed to provide a low-bed, wide-track carrying vehicle;

Fig. 5 is a plan view of the arrangement of Fig. 4;

Fig. 6 is a view in transverse section along the line 6—6 of Fig. 5;

Fig. 7 is a perspective view of the load carrying vehicle and its associated tractor truck with the vehicle axle cluster and a portion of the narrow track trunnion combination detached from the vehicle as might occur when widening or narrowing the track of the load carrying vehicle; and Fig. 8 is a perspective view of certain details of a trunnion pin and socket subcombination of a type that might be used in the present invention.

Briefly, the present invention relates to a narrow-track trunnion combination A that permits a load carrying vehicle to operate empty on normal truck routes and highways, free from any of the restrictions usually resulting from overwidth characteristics of the vehicle. Included within the combination, however, are dual trunnion assemblies that may be readily dismantled and reassembled to provide an extremely low-bed, wide-track carrying vehicle that is particularly suitable for transporting massive cargoes under overweight and overwidth permits of the type previously described. For example, the preferred embodiment of the invention, about to be described in accordance with Title 35, Section 112 of the U. S. Code, is particularly adapted for use with the load carrying vehicle described in the co-pending application, Serial No. 358,661, filed on June 1, 1953, by Henry W. Bigge.

Figure 1:
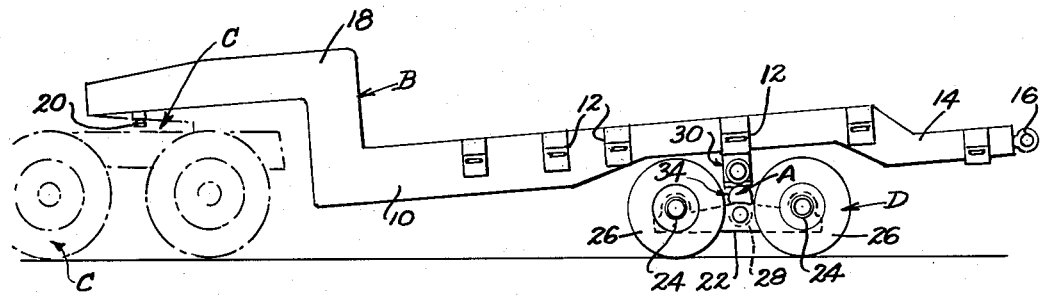
Fig. 1 is a view in side elevation of a load carrying vehicle provided with a narrow track trunnion combination according to the present invention.
Figure 2:
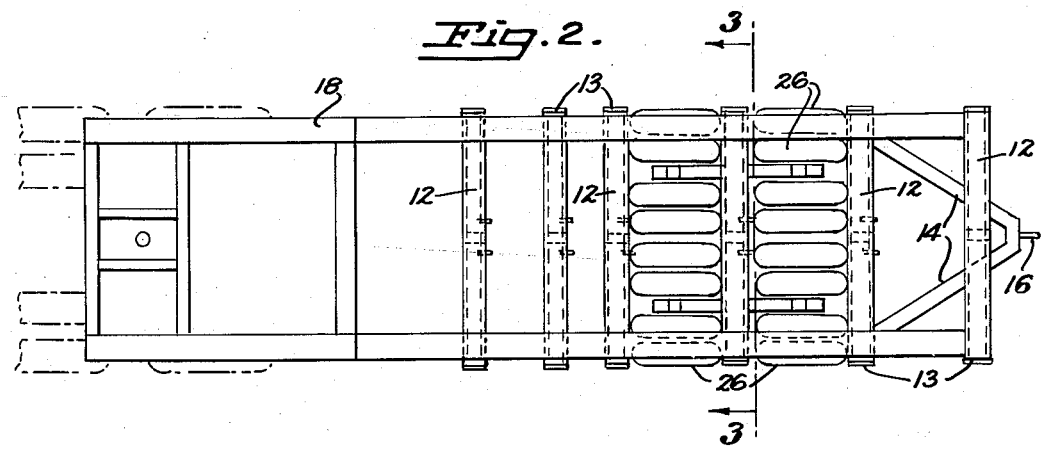
Fig. 2 is a plan view of the device of Fig. 1.
Figure 3:
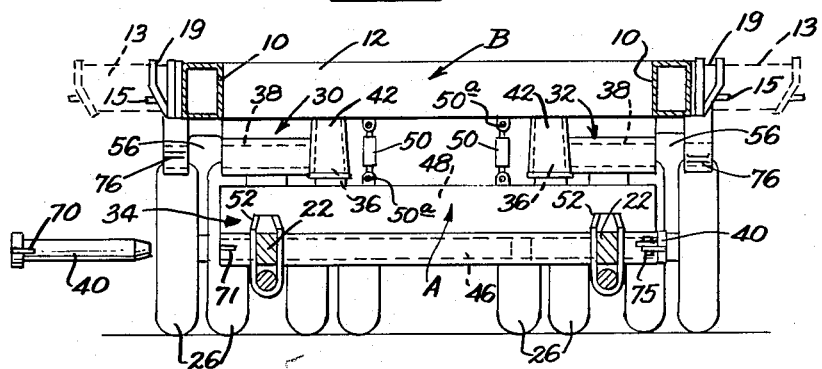
Fig. 3 is a view in transverse section along the line 3—3 of Fig. 2.

Referring to the drawings, Figs. 1 to 3 illustrate the narrow track trunnion combination A, of the present invention, installed on a semi-trailer or "jeep" B. The jeep B is supported by running gear D, and is adapted to be pulled by a tractor truck C.

The jeep B comprises main frame memers 10, transverse loading beams 12, and underslung beams 14 terminating in a steering connection 16 adapted for use with additional wheeled undercarriage members. Goosenecks 18 are provided in the main frame members to provide an elevated support for the pivoted connection 20 with the fifth wheel of the tractor C.

The running gear, or axle cluster, D includes conventional equalized walking beams 22, each of which is supported on axles 24 and a plurality of small tired wheels 26 in a well-known manner. The walking beams 22 are centrally apertured, as at 28, to receive trunnion axles providing a horizontal pivot between the jeep B and the running gear D.

The narrow-track trunnion combination A includes a wide-track assembly having two sections 30, 32 rigidly secured to a transverse loading beam 12, and a narrow-track assembly 34, releasably secured to the wide-track assembly by couplings 36 (Fig. 3). Each of the sections 30, 32 of the wide track assembly includes a vertical coupling socket 42 tapering upwardly to the cross beam 12.

The narrow-track assembly 34 comprises an elongated tubing socket 46 to receive the trunnion axle pins 40, socket 46 being held and aligned by a beam 48, from which the coupling members 36 project. The coupling projections 36 are also tapered and correspond in shape to the coupling sockets 42. Preferably the sockets 42 and the projections 36 are of truncated pyramidal shape to provide rigidity of structure and ease of coupling.

Completing the coupling between the narrow and wide-track assemblies are turnbuckles 50 that draw the projections 36 snugly into the sockets 42, taking full advantage of the tapered fit and allowing for wear between the parts. The turnbuckles preferably have clevis ends which are secured to cooperating brackets on the beams 12 and 48 by means of pins 50a. When the turnbuckles are loosened the pins 50a may be easily withdrawn allowing the various parts to be uncoupled.

As best seen in Fig. 3, portions of the narrow-track tubing socket 46 are cut away, as at 52, to receive the central portions of the walking beams 22. In this manner, the narrow-track trunnion combination A is connected to the running gear D; the trunnion pins 40 being passed into the narrow track tubing socket 46 and through the apertures 28 of the walking beams. If desired, the trunnion pins 40 may be secured into the socket 46. A preferred means for accomplishing this result is illustrated in Fig. 8, where a pin 40 is shown partly withdrawn from the socket 46. As shown, the pin and socket are provided with meshing projections 70 and 71, which have holes 72 and 73, respectively, to receive cotter pins 74. A larger hole 75 may also be provided in the projections 70 to facilitate removal of the pins from the sockets by insertion of a suitable tool therein that may be pulled to slide the pin 40 out of the socket 46 after the cotter pins 74 have been removed.

It will be observed that the trunnion combination A, appearing in Figs. 1 to 3, effectively reduces the axle span of the load carrying vehicle to a width not exceeding the width of the main frames 10 and cross beams 12. This is accomplished by raising the frame of the carrying vehicle B above the running gear D so that the wheels 26 are free to run under and spaced from the frame instead of straddling the respective frame members 10 and 12. However, the novel construction of the trunnion fitting A allows the combined assemblies 30, 32 and 34 to be dismantled and reassembled as in Figs. 4 to 6 to provide a wide-track, low-bed carrying construction especially adapted for the transporting of massive cargo under overload and overwidth permits, which necessarily require the load to be distributed over a much greater surface area of the highway.

The accomplish this purpose, it is only necessary to loosen and disengage the turnbuckles 50 allowing the projections 36 to be removed from the coupling sockets 42, thereby freeing the narrow track assembly 34 and the running gear D from their positions beneath the frame. Then, the running gear D is separated from the narrow track assembly by withdrawing trunnion pins 40, and is reconnected to the wide track assembly 30, 32 by the use of the same pins 40. As will be explained, a particular feature of the trunnion combination just described, is the ease with which the operations involved in widening the running gear may be carried out whether performed within the hauler's yards or on the road by the driver.

Referring to Figs. 4 to 6, it will be observed that the wide-track assembly includes two sections 30 and 32, each provided with horizontal tubing sockets 38 and the vertical coupling sockets 42. The sockets 38 have substantially the same cross-section as the narrow-track socket 46 and are likewise cut away, as at 56, so that the walking beams 22 may be pivotally connected to the wide-track assembly by the pins 40 in the same manner as before. An apertured projection 76 may similarly be provided on the sockets 38 to permit the pins to be secured in place by the cotter pins 74.

The open construction of the jeep B permits the frame to be lowered onto the widened running gear D so that the wheels 26 straddle the frame and extend up into wheel wells formed by the spaces between the main frames 10 and loading beams 12. In Figs. 4 and 6 it may be seen that this construction permits a carrying bed that is flush with the tops of the wheels 26. As a result, it is only necessary to raise the load as high as the tops of the tires supporting the jeep B. In the case of standard 8:25–15 tires this height is not over 33 inches, requiring considerably less loading energy than is normally required. This is true regardless of the type of load, and regardless of whether it is loaded by a hoist or by driving the load under its own power up a ramp onto the sturdy loading beams 12.

To take advantage of the widened track of the running gear, provision is made for widening the load carrying platform of the jeep. This is accomplished by equipping the transverse loading beams 12 with telescoping outriggers 13 adapted to slide inside the beams. Handles 15 may be provided at the ends of the outriggers 13 to facilitate their manipulation, while stops 17 may be provided inside the beams 12 to slide within corresponding grooves in the outriggers to limit their outward movement (Fig. 6). Similarly, flanges 19 may be provided on the outer ends of the outriggers 13 to limit their inward movement. The widened jeep frame is particularly useful when loading wide-tracked crawler rigs such as steam shovels and the like, directly onto the jeep frame.

Fig. 7 illustrates one procedure for manipulating the trunnion combination A to either widen or narrow the track of the load carrying vehicle, as the case may be.

To widen the load carrying rig, supports, such as wooden beams 60, are positioned under the jeep B at a point adjacent its center of balance. The fifth wheel of the truck C is then disconnected from the jeep B and the truck is moved into a position similar to that shown in Fig. 7 so that its hoist 62 may be utilized to lift the rear end of the jeep. The hoist 62 may be standard equipment, either rigidly secured to the truck or detachably mounted.

The hoist is operated just sufficiently to take the load off the turnbuckles 50, so that they may be easily loosened by hand and disengaged upon removal of the pins 50a. The hoist 62 is then operated to lift the coupling sockets 42 off the projections 36. In this position of the jeep frame, the walking beams 22 and their respective clusters of axles 24 and wheels 26 may be rolled to a position clear of the frame, as shown. There the narrow-track assembly 34 may be easily removed from the walking beams 22 by jiggling the assembly 34 by hand until the pins 40 can be pulled out of the tubing socket 46.

After the narrow-track trunnion assembly 34 is removed the respective walking beams 22 may be separately rolled into place under the wide-track trunnion assembly and the hoist lowered until the jeep frame and sections 30, 32 of the wide-track assembly are in position to allow the pins 40 to be inserted into the tubing sockets 38, through walking beam apertures 28. The pins 40 may then be locked into position by further inserting the cotter pins 74 through the apertured projections 70 and 76.

In this position, the jeep main frames 10 will be directly above the walking beams 22, allowing the wheels 26 to straddle the frames 10 and extend up into wheel-well spaces formed by the loading beams 12. The telescoping outriggers 13 may now be pulled out to their extended positions by the handles 15 (Figs. 5 and 6). Also, the detached narrow-track assembly 34 may be strapped into a special bracket on the inside of the jeep frame (not shown) during the load carrying operation.

On completion of a load carrying run, the procedure for narrowing the track is the reverse of that just described. After blocking the jeep B and moving the truck C into the position shown, the truck hoist 62 is used to jiggle the jeep frame 13 with respect to the running gear D until the pins 40 may be easily removed from the wide-track tubing sockets 38. The walking beam units 22 are again rolled to the rear, as in Fig. 7, and the narrow-track assembly 34 positioned over the running gear by inserting the pins 40 into the tubing socket 46, through the apertures 28 of the walking beams. The assembly 34 may now be locked to the running gear by inserting the cotter pins 74 through the aligned openings 72 and 73. Next, the combined structure is rolled into place under the jeep frame, and the truck hoist operated to lower the coupling sockets 42 onto the projections 36. The turnbuckles 50 are now engaged, the pins 50a inserted, and the projections 36 drawn tightly into the sockets 42. The truck C is now free to return to its normal hauling position with respect to the jeep B.

It is noted that each of the operations involved in uncoupling the combination A or in reassembling it into a single unit may be performed in safety and with little danger of the jeep frame falling on the driver during the operation. This is due to the adequate three-point suspension provided by the supporting beams and truck hoist. In addition, there is no real necessity for either the driver or his assistants to go under the frame during the operation since all gear may be manipulated from the side.

By the above described construction, it is clear that the narrow-track trunnion combination A provides a convenient means to convert, a low-bed, wide-track load carrying combination, operable only by permit, into a narrow-track rig that may be freely operated on the highways under any normal trucking conditions. The trunnion combination A achieves this result by lifting the load carrying frame to a sufficient height above the running gear so that the running gear may be narrowed without interfering with the usual wheel-wells. Also, the unique structure of the trunnion combination A, including dual trunnion assemblies and easily manipulated coupling means, permits a rapid lowering of the frame to a load carrying position with the tires extending well up into the frame, flush with the loading platform of the frame.

It is significant that the operations involved in either widening or narrowing the running gear may be quickly and easily performed at almost any point along a hauling route at the direction of the driver and with a minimum of outside assistance. Because of the size and weight of the equipment involved, two men will normally work together on this job. However, it is significant that these operations could be entirely performed by the driver of the load carrying rig, without help should it become necessary. Consequently an important feature of the invention is the relative safety with which conversion of the load carrying vehicle into one or the other width may be carried out.

The primary advantage of the invention, however, lies in the combination of narrow and wide-track trunnion assemblies into one unit that may be readily manipulated, as desired, to provide a load carrying vehicle capable of operation either with or without over-width permits, with the extra load benefits resulting from the former. As a result, a heavy hauler may undertake overload hauling jobs without the danger of expensive delays and layovers hampering his work program.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting. For example, use of the trunnion combination A is not limited to the particular jeep construction disclosed but could be used in combination with any conventional type of wheeled load carrying semi-trailer; also, the various couplings within the trunnion combination could assume other or varied forms.

What is claimed is:

1. In a load carrying vehicle adapted for use on the highways the combination of: a load carrying frame, a plurality of independently mounted wheel units to support said frame, trunnion means cooperating with said wheel units and said frame to provide for each of said wheel units more than one supporting position outwardly from a fore and aft center line of said frame, said trunnion means comprising in subcombination two trunnion assemblies mounted one above the other and coupling means between said two assemblies, said coupling means comprising sockets on one trunnion assembly engaging corresponding projections on another.

2. In a load carrying vehicle adapted for use on the highways the combination of: a plurality of independently mounted wheel units; a load-carrying frame adapted to be supported by said units and having a plurality of wheel spaces to receive said wheel units when the frame is in a loading position; a plurality of trunnion assemblies mounted one above the other to space said frame from the wheel units and to provide a narrow track trunnion connection to said wheel units when the frame is unloaded, and coupling means between said trunnion assemblies whereby a lower trunnion assembly may be disconnected and said frame lowered to a wide track trunnion connection with said wheel units when the frame is in a loading position.

3. The vehicle of claim 2 wherein said coupling means comprises vertically disposed sockets on one trunnion assembly receiving corresponding projections on another of said trunnion assemblies.

4. The vehicle of claim 2 wherein the narrow and wide trunnion connections to said wheel units comprise horizontally disposed trunnion sockets alternately secured to said wheel units by trunnion pins, whereby the independent wheel units may be rolled clear of the frame while the trunnion assemblies are being uncoupled and then rolled back into position beneath the frame.

5. A narrow track trunnion combination adapted for use with a load carrying vehicle comprising a wide track assembly including a first set of horizontal tubing sockets and vertical coupling sockets, a narrow track assembly including a second set of horizontal tubing sockets and coupling projections engaged in said coupling sockets, and trunnion pins inserted in said second set of tubing sockets to secure running gear to said load carrying vehicle, whereby the narrow track trunnion combination may be dismantled and the running gear secured to the carrying vehicle by inserting said trunnion pins in said first set of tubing sockets to form a wide track trunnion combination.

6. The combination of claim 5 wherein said coupling sockets and coupling projections are of truncated pyramidal shape to provide both rigidity of structure and ease of coupling.

References Cited in the file of this patent

UNITED STATES PATENTS

| | | |
|---|---|---|
| 1,710,122 | Sorenson | Apr. 23, 1929 |
| 1,824,234 | Rhodes | Sept. 22, 1931 |
| 2,248,080 | Hathaway | July 8, 1941 |
| 2,318,802 | Reid | May 11, 1943 |